United States Patent
Pham et al.

(10) Patent No.: US 11,436,307 B2
(45) Date of Patent: Sep. 6, 2022

(54) SYSTEM TO UTILIZE USER'S ACTIVITIES PATTERN AS ADDITIONAL AUTHENTICATION PARAMETER

(71) Applicant: Capital One Services, LLC, McLean, VA (US)

(72) Inventors: Vincent Pham, Champaign, IL (US); Jeremy Goodsitt, Champaign, IL (US); Anh Truong, Champaign, IL (US); Austin Walters, Savoy, IL (US); Galen Rafferty, Mahomet, IL (US); Reza Farivar, Champaign, IL (US)

(73) Assignee: Capital One Services, LLC, McLean, VA (US)

( * ) Notice: Subject to any disclaimer, the term of this patent is extended or adjusted under 35 U.S.C. 154(b) by 171 days.

(21) Appl. No.: 16/866,231

(22) Filed: May 4, 2020

(65) Prior Publication Data

US 2021/0342426 A1 Nov. 4, 2021

(51) Int. Cl.
*G06F 21/31* (2013.01)
(52) U.S. Cl.
CPC .................. *G06F 21/316* (2013.01)
(58) Field of Classification Search
CPC .............. G06F 21/316; G06F 2221/2113
USPC .............................................. 726/7
See application file for complete search history.

(56) References Cited

U.S. PATENT DOCUMENTS

| 9,386,447 | B2 | 7/2016 | Tibbitts et al. |
| 10,200,364 | B1 | 2/2019 | Ketharaju et al. |
| 10,250,611 | B2 | 4/2019 | Herrmann et al. |
| 10,296,883 | B2 | 5/2019 | Kursun et al. |
| 2014/0130127 | A1* | 5/2014 | Toole ............... H04L 63/105 726/3 |
| 2014/0157401 | A1* | 6/2014 | Alameh ............ G06F 21/32 726/17 |
| 2015/0229624 | A1* | 8/2015 | Grigg ............... G06F 21/316 726/7 |
| 2016/0210450 | A1* | 7/2016 | Su .................... H04L 63/10 |
| 2019/0182749 | A1 | 6/2019 | Breaux et al. |

\* cited by examiner

*Primary Examiner* — Jacob Lipman
(74) *Attorney, Agent, or Firm* — Sterne, Kessler, Goldstein & Fox P.L.L.C.

(57) ABSTRACT

A method and system to utilize a user's activities pattern on a user equipment (UE) device as an additional authentication parameter are disclosed. The method includes monitoring, at the UE device, activities of the UE device, and generating, at the UE device, at least one pattern based on analysis of the monitored activities of the UE device. The method further includes receiving, at the UE device, a request to access a protected application. The method includes comparing, at the UE device, an activity of the UE device with an activity determined from the at least one pattern and a corresponding time data associated with the request to access the protected application. The method further includes determining, at the UE device, a level of authentication necessary to grant access to the protected application based on the comparing.

21 Claims, 6 Drawing Sheets

SYSTEM TO UTILIZE USER'S ACTIVITIES PATTERN AS ADDITIONAL AUTHENTICATION PARAMETER

BACKGROUND

Mobile devices are typically used for a variety of functions, including phone conversation, messaging, work and/or home emails, and transactions such as banking, social networking, etc. Such transactions are performed using mobile applications downloaded and installed on the mobile device or using a web browser application. In either case, it is important to provide a mechanism for user authentication. The authentication of the user may require the user to provide his username and password. In some cases, for additional security, a two-factor authentication mechanism or similar method is used. While the use of two-factor authentication or another similar method may provide additional security, asking users to go through an additional step for authentication could be frustrating. Therefore, there is a need to provide a seamless user experience without compromising the security of the user and without requiring additional authentication steps.

BRIEF DESCRIPTION OF THE DRAWINGS/FIGURES

The accompanying drawings are incorporated herein and form a part of the specification.

In the drawings, like reference numbers generally indicate identical or similar elements. Additionally, generally, the left-most digit(s) of a reference number identifies the drawing in which the reference number first appears.

DETAILED DESCRIPTION

Provided herein are methods, systems, and computer program products and/or combinations and sub-combinations thereof, for utilizing a pattern of activities of a user as an additional authentication parameter. In particular, based on the user's activities pattern, the user is granted access to a protected application without a higher level of authentication. For example, in one embodiment, a user equipment (UE) device, such as a phone, is installed with a mobile application to perform various transactions. The mobile application may be a banking application, and a user of the UE device may use the mobile application to perform transactions with his bank. The user may log in to the mobile application by providing his user identification (id) name and password. In some cases, instead of user id and password, the user may use his biometric information such as fingerprint or facial features, etc., to login to the mobile application. For additional security, the user may be asked to provide additional information or a scheme generally known in the art as two-factor authentication may be used. However, as described in detail below, the user may be authenticated without two-factor authentication or requiring additional information from the user, based on a pattern of the user's activities on the UE device. For example, the pattern of the user's activities may be location activities of the UE device and/or usage of the application on the UE device. In other words, the pattern of the user's activities may suggest an identity of the user, and, therefore, may be used as an authentication parameter.

Various embodiments of this disclosure will be discussed with respect to the corresponding figures.

Figure 1:
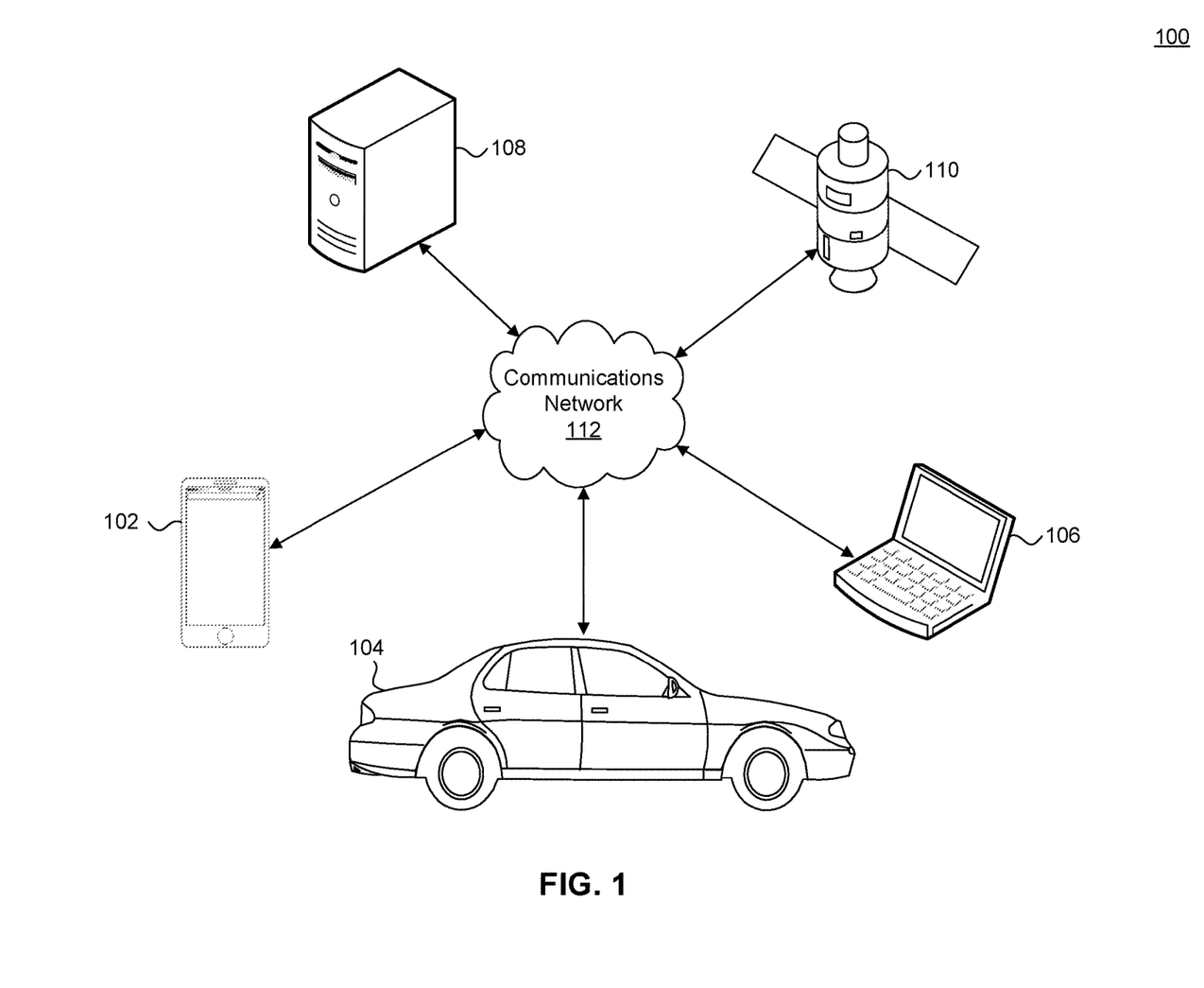
FIG. 1 illustrates an exemplary network architecture, in accordance with some embodiments.

FIG. 1 illustrates an exemplary network architecture, in accordance with some embodiments. The exemplary network 100 may comprise a user equipment (UE) device 102, another UE device 106, a vehicle 104, an application server 108, and a satellite 110, and a communications network 112. The vehicle may be associated with the owner of the UE device 102 and/or 106.

The UE device 102 may be a smartphone, a mobile phone, a tablet, etc. Similarly, the other UE device 106 may be a computer, a laptop, a tablet, etc. While only two UE devices 102 and 106 are shown in FIG. 1, the network may comprise a plurality of UE devices. As discussed below, a user's activities pattern on each UE device of the plurality of UE devices may be used as an additional authentication parameter as part of a login procedure.

The application server 108 may be a backend system of the one or more mobile applications on the UE devices 102 and/or 106. Even though only one application server 108 is shown in FIG. 1, there may be a plurality of application servers to provide a different kind of services to the UE devices 102 and/or 106, and the vehicle 104. The UE devices 102 and/or 106 may communicate with the application server 108 via the communications network 112. The communications network 112 may be a wireless network, for example, a 3G, 4G, 5G, Local Area Network (LAN), Wide Area Network (WAN), public switched packet network, satellite communications network, etc.

The satellite 110 may provide navigation and/or communication services to the UE devices 102 and/or 106, and the vehicle 104. Accordingly, each of the UE devices 102 and/or 106, and the vehicle 104 may receive its current location information from the satellite 110 over the communications network 112.

One or more mobile applications may be installed on the UE devices 102 and/or 106, and/or the vehicle 104. Using a mobile application on the UE devices 102 and/or 106, and/or the vehicle 104, a user may perform a variety of transactions while in communication with the application server 108. However, prior to using the mobile application to perform a transaction, the user may need to be authenticated using credentials such as user id, password, and/or biometric information such as fingerprint, facial features, etc. The user may also be required to provide additional information before the user may be granted access to the mobile application. By way of non-limiting example, the additional information may be an answer(s) to a user-selected security question(s) or an alphanumeric code sent to the user device on which the mobile application is installed. For example, the user may be authenticated using two-factor authentication.

Figure 2:
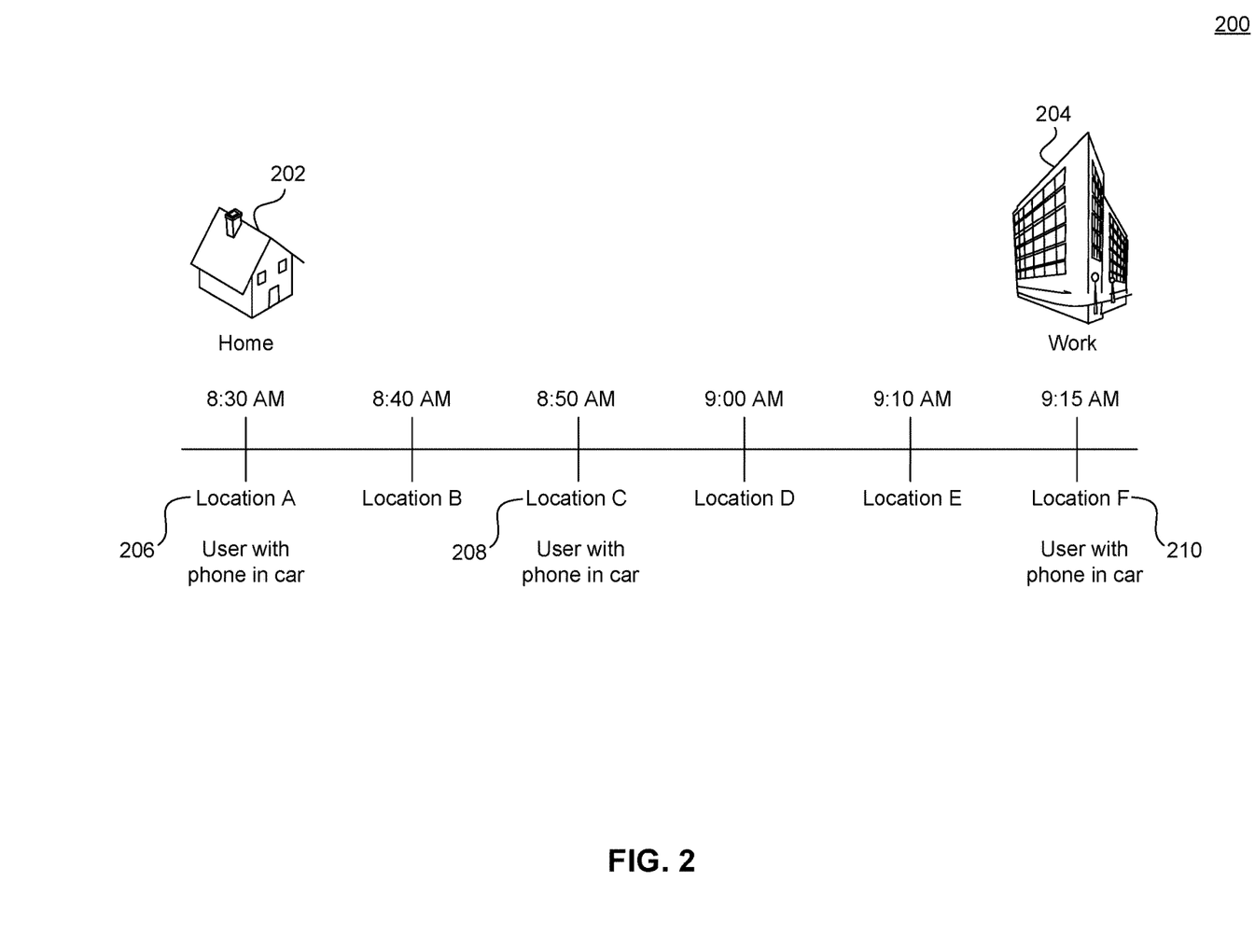
FIG. 2 illustrates an exemplary timeline of a user location, in accordance with some embodiments.

FIG. 2 illustrates an exemplary timeline of a user location, in accordance with some embodiments. As described above, a pattern of a user's activities may be used as an additional authentication parameter. The pattern may be, for example, a user's location history based on the location of the UE device 102. By way of non-limiting example, the mobile application on the UE device 102 may record a location of the UE device at preconfigured times or within a preconfigured and/or user-specified threshold of the preconfigured times. The mobile application may store the location information of the UE device and a time corresponding to the location information of the UE device in a memory of the UE device. The time may be coordinated universal time (UTC) or time in a corresponding time zone.

It is common to leave for work from your home at a fixed time on weekdays and vice versa. On most weekdays, it generally takes the user the same amount of time on the road to reach the workplace from home. Accordingly, the user's location on the road may generally be within a vicinity of the same location when compared to a time of day. Similarly, when the user is at the workplace, the location of the user's device would also be known. The schedule of a user on the weekend may also be predictable on most weekends. Accordingly, the location information of a user's UE device may form a pattern that may be verified and, therefore, may be used as an authentication parameter. The UE device 102 may retrieve traffic data using an application programming interface to a traffic server or the application server 108. The UE device 102 may use the received traffic data to confirm that the user has taken the same route or the user is at the location that corresponds with the observed location pattern. Alternatively, the pattern can be created, e.g., to include a range, to take into consideration traffic, weather or other factors that a user may not be at the expected location.

As shown in FIG. 2, for example, the user may leave from his home 202 at 8:30 AM to go to his workplace 204. Accordingly, at 8:30 AM, the location of the user's UE device would be the home address of the user. As described above, the mobile application on the UE device may record the location of the UE device at a preconfigured time or a preconfigured time interval, for example, every 10 minutes. Accordingly, the mobile application may record the location of the UE device at 8:30 AM to be at home address or location A 206. The mobile application may store the location information, for example, as GPS coordinates, and the corresponding time 8:30 AM in UTC format in the memory of the UE device. The mobile application may also record the location of the UE device at every 10 minutes, and, therefore, the UE device's location at 8:40 AM at location B, at 8:50 AM at location C 208, at 9:00 AM at location D, at 9:10 AM at location E may be recorded in the memory of the UE device along with the corresponding time. At 9:15 AM, the user may arrive at the workplace 204. Accordingly, at 9:20 AM, the location of the user's UE device would be the workplace 204 of the user 210. Location information of the UE device throughout the day may thus be recorded. A pattern can then be established in regard to the location of the user's UE device. For example, the pattern might be that the user is within the vicinity of the same location (e.g., the workplace) from 9:15 AM to 5:00 PM on most days. The pattern can then be used as an authentication parameter to log in the user to a particular application program.

Figure 3:
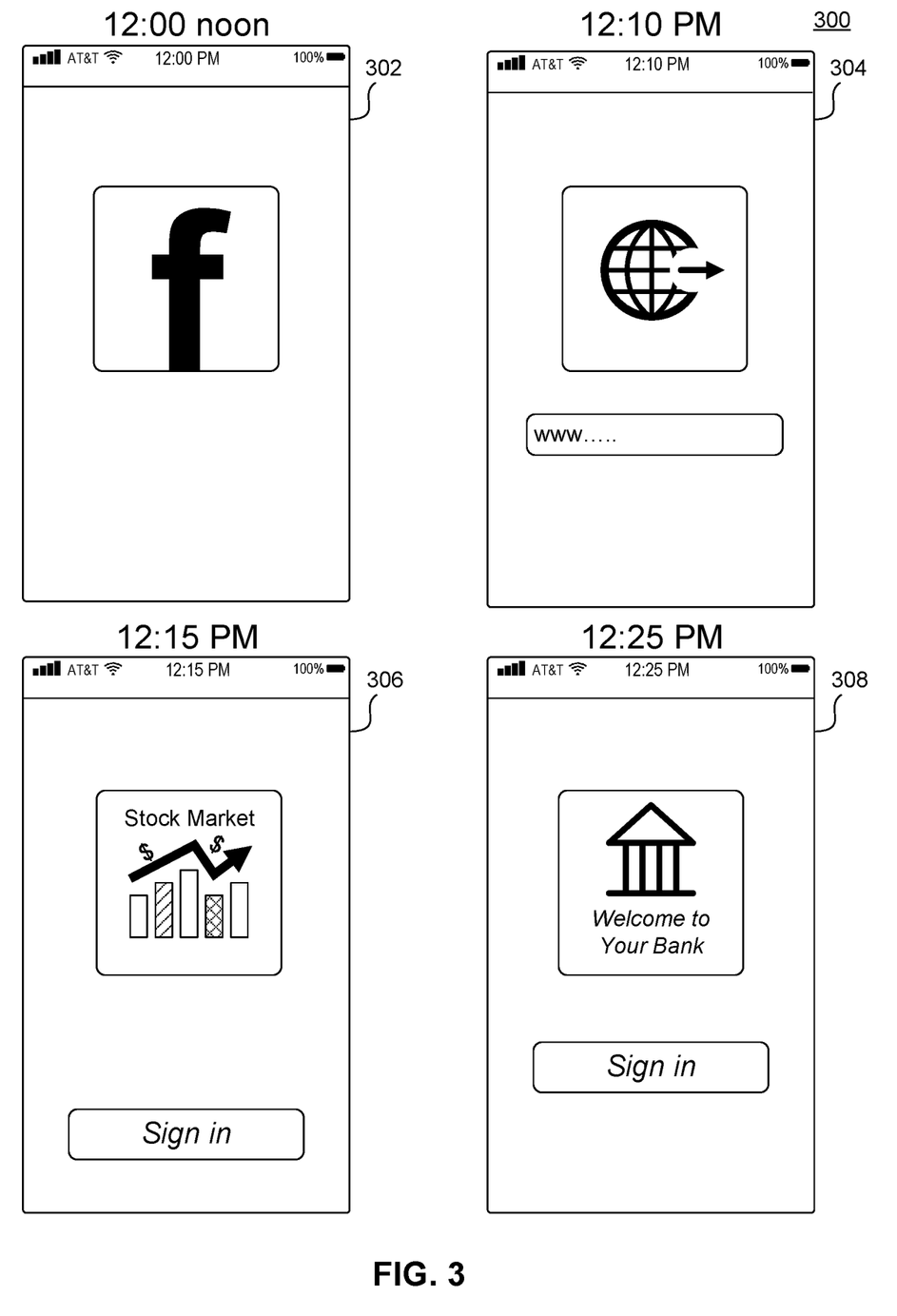
FIG. 3 illustrates an exemplary user activity of a user equipment (UE) device, in accordance with some embodiments.

FIG. 3 illustrates an exemplary user activity of the UE device, in accordance with some embodiments. Similar to monitoring location information of a user's UE device, the user's application usage or accessing of mobile applications on the UE device may also form a pattern, which may be used as an authentication parameter. For example, the user may access during his lunch break at noon his social networking account 302. After checking his social networking account for about 10 minutes, the user may browse the Internet using a web browser at about 12:10 PM 304. After checking the news on the web browser for about 5 minutes, the user may visit a financial website or a mobile financial application at about 12:15 PM 306. The user at 12:25 PM 308 may check his bank account. Accordingly, the user's application activities on the UE device may also form a pattern over time that may be used as an authentication parameter. In other words, if the user accesses his bank account every day between 12:10 PM and 12:30 PM, this pattern can be used instead of a two-factor authentication mechanism.

In addition to the location information of the UE device and the application access activities, the user's outgoing call or messaging history may also be used as an authentication parameter.

Figure 4:
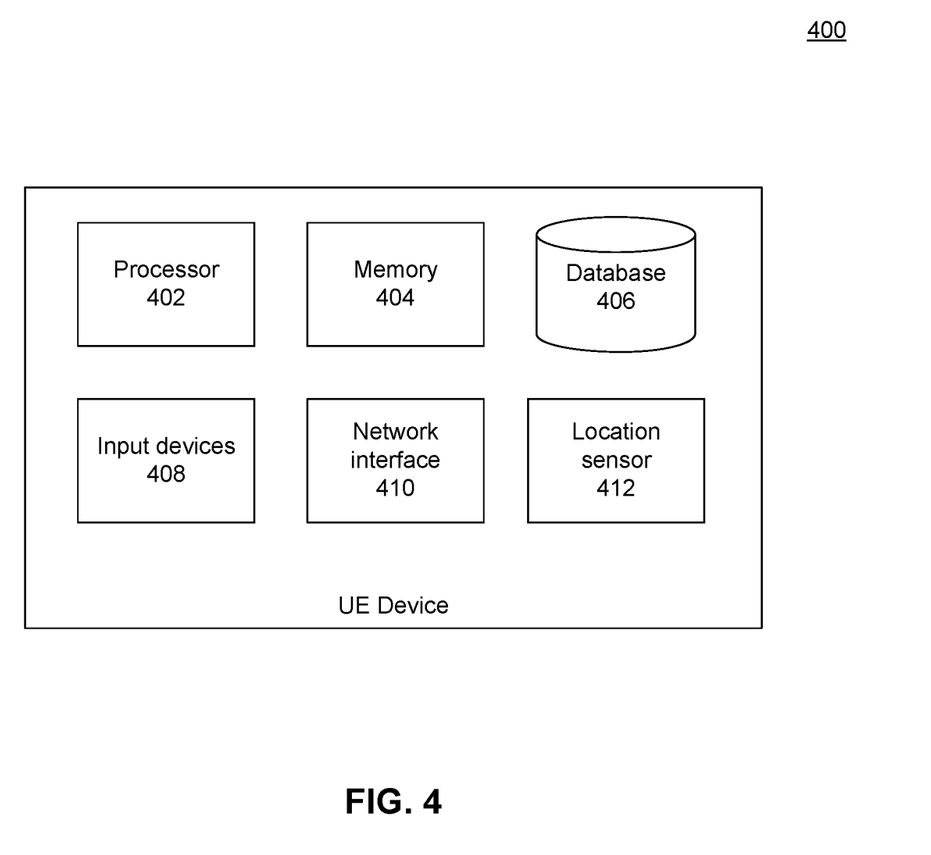
FIG. 4 illustrates an exemplary block diagram of the UE device in accordance with some embodiments.

FIG. 4 illustrates an exemplary block diagram of the UE device in accordance with some embodiments. As shown in FIG. 4, the block diagram 400 of the UE device 102 or 106 comprises a processor 402, a memory 404, a database 406, an input device 408, a network interface 410, and a location sensor 412. The processor 402 of the UE device may execute instructions of the mobile application and/or operations of various embodiments as described herein. The memory 404 may store the instructions of the mobile application and/or operations of the various embodiments as described herein.

The database 406 may be a lightweight database such as SQLite, OrmLite, realm, Couchbase lite, and/or Berkeley DB, etc. The database 406 may be an in-memory database. The database 406 may store the UE device's location information and corresponding time, and/or application access on the UE device and corresponding time, and/or any other information that may form a pattern, and may be used as an authentication parameter.

The input device 408 may be a physical and/or a virtual keyboard. The input device 408 may be any interface that may be used to provide input information, for example, a microphone that may be used to provide input as oral commands. The network interface 410 may enable the UE device to communicate with other UE devices, the application server, and/or the satellite over the communications network 112. The location sensor 412 may enable detection of the location of the UE device in coordination with the satellite 110.

Figure 5:
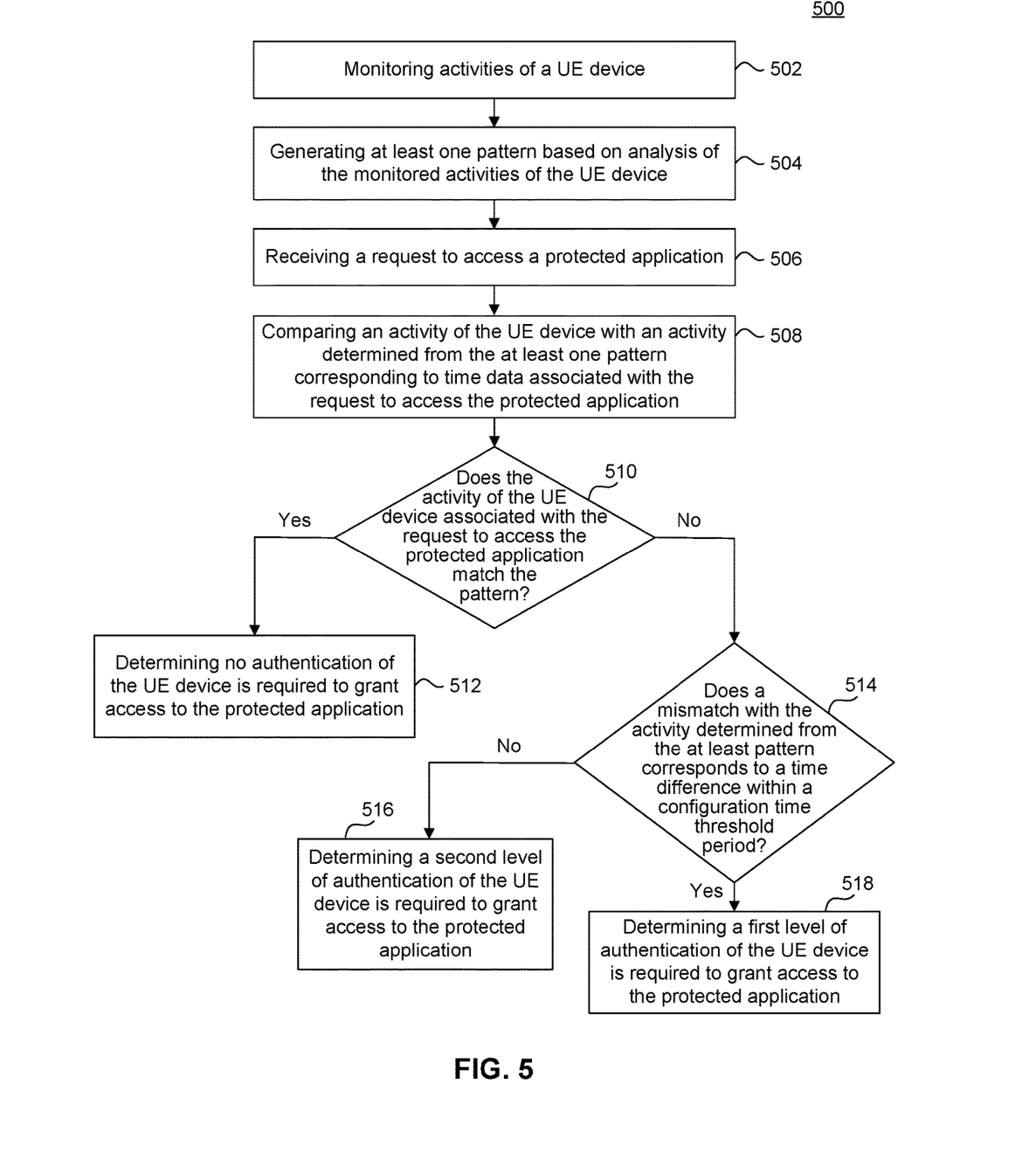
FIG. 5 illustrates a flow-chart of a method to utilize a user's activities pattern as an additional authentication parameter in accordance with some embodiments.

FIG. 5 illustrates a flow-chart of a method to utilize the pattern of a user's activities as an additional authentication parameter in accordance with some embodiments. As shown in the flow-chart 500, at step 502, the user's activities on the UE device may be monitored over a period of time, e.g., days, weeks or even months. In fact, the step of monitoring may be continuously updating in the background as time passes. For example, a initial pattern could be established over a two day period. Then updated after a week, then again after a month. The monitoring is not limited to any specific period of time. As described above, the user's activities may be, for example, the location information of the UE device, and/or the access history of an application executing on the UE device. The user's other activities, for example, including outgoing calls or messaging history may also be monitored.

At step 504, at least one pattern may be generated based on the monitored activities at step 502 on the UE device. By way of non-limiting example, a user's current location can be compared to the at least one pattern to determine whether the location of the UE device is within a vicinity of the location recorded corresponding to a time of the day as described above with reference to FIG. 2. The at least one pattern may also identify the user's application access on the UE device corresponding to a time of the day, as described above with reference to FIG. 3. In one embodiment, the location and access information may be used together as an authentication parameter.

At step 506, the user may request access to the UE or the mobile application that is protected. At step 508, the user's activities on the UE device as monitored within a predetermined threshold time period may be compared with the at least one pattern generated at step 504. Accordingly, the user's activity on the UE device may be compared with the user's activity based on the at least one pattern before granting the user access to the protected application. For example, the location of the UE device at the time of requesting access to the protected application on the UE device may be compared against the location of the UE device based on the at least one pattern that corresponds with the time of requesting access to the protected application on the UE device.

At step 510, based on the comparison, it may be determined whether the activity of the UE device associated with the request to access the protected application matches with the activity determined from the at least one pattern generated based on the analysis of the monitored activities. If it is determined that the activity of the UE device associated with the request to access the protected application matches with the at least one generated pattern, as shown in FIG. 5 by step 512, the user may be given access to the protected application without any authentication. In one embodiment, the user may be required to provide his user id and password, or his biometric information to gain access to the protected application, but no additional level of authentication, for example, two-factor authentication, etc., may be required.

However, at step 510, if it is determined that the activity of the UE device associated with the request to access the protected application does not match with the at least one generated pattern, at step 514, a determination is made whether a mismatch with the activity determined from the at least one pattern corresponds to a time difference within, for example, a preconfigured time threshold period. If it is determined that the mismatch is not within the preconfigured time threshold period, at step 516, it may be determined that an additional level of authentication or a second level of authentication, for example, a two-factor authentication mechanism, etc., may be required before the user is granted access to the protected application. On the other hand, if it is determined that the mismatch is within the preconfigured time threshold period, as shown by step 518, only a first level of authentication, for example, using user id and password, or biometric information may be required before the user is given access to the protected application. Instead of the preconfigured time threshold period, it may also be possible to have a time threshold period that may be dynamically determined based on various factors, such as traffic on the road, late schedule of all the regular activities, etc.

In one embodiment, alternatively (or in combination with time) at step 514, a determination may be made whether a mismatch with the activity determined from the at least one pattern corresponds to a location difference of the UE device associated with the request to access the protected application. If it is determined that the location mismatch is not within a preconfigured threshold radius distance, at step 516, it may be determined that an additional level of authentication or a second level of authentication, for example, a two-factor authentication mechanism, etc., may be required before the user is granted access to the protected application. On the other hand, if it is determined that the location mismatch is within the preconfigured threshold radius distance, as shown by step 518, only a first level of authentication, for example, using user id and password, or biometric information may be required before the user is given access to the protected application.

Figure 6:
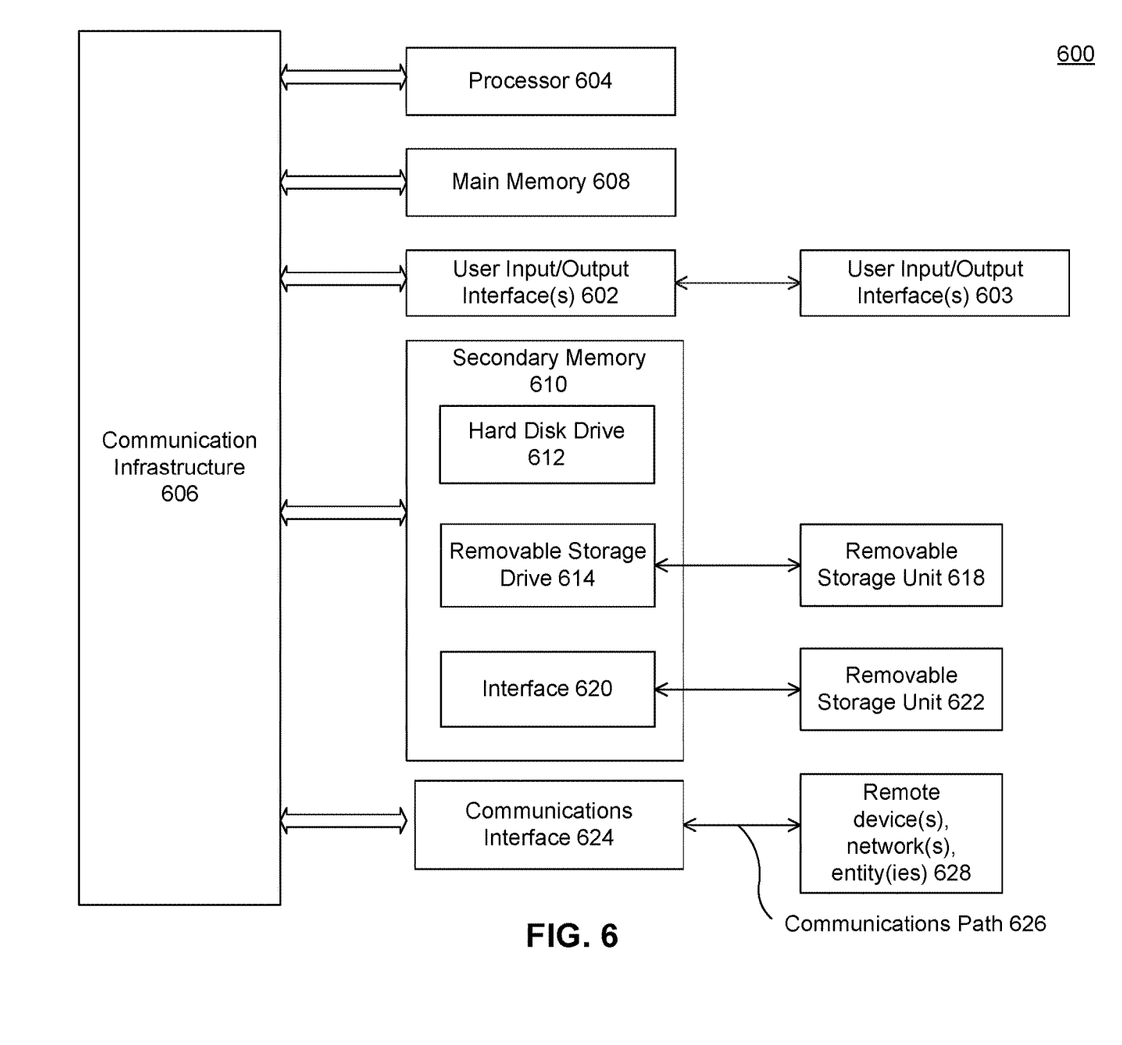
FIG. 6 illustrates an exemplary computer system, in accordance with some embodiments.

FIG. 6 illustrates an example of a computer system in accordance with some embodiments.

Various embodiments may be implemented, for example, using one or more well-known computer systems, such as a computer system 600, as shown in FIG. 6. One or more computer systems 600 may be used, for example, to implement any of the embodiments discussed herein, as well as combinations and sub-combinations thereof.

The computer system 600 may include one or more processors (also called central processing units, or CPUs), such as a processor 604. The processor 604 may be connected to a communication infrastructure or bus 606.

The computer system 600 may also include user input/output device(s) 603, such as monitors, keyboards, pointing devices, etc., which may communicate with communication infrastructure 606 through user input/output interface(s) 602.

One or more processors 604 may be a graphics processing unit (GPU). In an embodiment, a GPU may be a processor that is a specialized electronic circuit designed to process mathematically intensive applications. The GPU may have a parallel structure that is efficient for parallel processing of large blocks of data, such as mathematically intensive data common to computer graphics applications, images, videos, etc.

The computer system 600 may also include a main or primary memory 608, such as random access memory (RAM). Main memory 608 may include one or more levels of cache. Main memory 608 may have stored therein control logic (i.e., computer software) and/or data.

The computer system 600 may also include one or more secondary storage devices or memory 610. The secondary memory 610 may include, for example, a hard disk drive 612 and/or a removable storage device or drive 614. The removable storage drive 614 may be a floppy disk drive, a magnetic tape drive, a compact disk drive, an optical storage device, tape backup device, and/or any other storage device/drive.

The removable storage drive 614 may interact with a removable storage unit 618. The removable storage unit 618 may include a computer-usable or readable storage device having stored thereon computer software (control logic) and/or data. The removable storage unit 618 may be a floppy disk, magnetic tape, compact disk, DVD, optical storage disk, and/any other computer data storage device. The removable storage drive 714 may read from and/or write to the removable storage unit 618.

The secondary memory 610 may include other means, devices, components, instrumentalities, or other approaches for allowing computer programs and/or other instructions and/or data to be accessed by the computer system 600. Such means, devices, components, instrumentalities, or other approaches may include, for example, a removable storage unit 622 and an interface 620. Examples of the removable storage unit 622 and the interface 620 may include a program cartridge and cartridge interface (such as that found in video game devices), a removable memory chip (such as an EPROM or PROM) and associated socket, a memory stick and USB port, a memory card and associated memory card slot, and/or any other removable storage unit and associated interface.

The computer system 600 may further include a communication or network interface 624. The communication interface 624 may enable the computer system 600 to communicate and interact with any combination of external devices, external networks, external entities, etc. (individually and collectively referenced by reference number 628). For example, the communication interface 624 may allow the computer system 600 to communicate with the external or remote devices 628 over communications path 626, which may be wired and/or wireless (or a combination thereof), and which may include any combination of LANs, WANs, the Internet, etc. Control logic and/or data may be transmitted to and from the computer system 600 via the communication path 626.

The computer system 600 may also be any of a personal digital assistant (PDA), desktop workstation, laptop or notebook computer, netbook, tablet, smartphone, smartwatch or other wearable, appliance, part of the Internet-of-Things, and/or embedded system, to name a few non-limiting examples, or any combination thereof.

The computer system 600 may be a client or server, accessing or hosting any applications and/or data through any delivery paradigm, including but not limited to remote or distributed cloud computing solutions; local or on-premises software ("on-premise" cloud-based solutions); "as a service" models (e.g., content as a service (CaaS), digital content as a service (DCaaS), software as a service (SaaS), managed software as a service (MSaaS), platform as a service (PaaS), desktop as a service (DaaS), framework as a service (FaaS), backend as a service (BaaS), mobile backend as a service (MBaaS), infrastructure as a service (IaaS), etc.); and/or a hybrid model including any combination of the foregoing examples or other services or delivery paradigms.

Any applicable data structures, file formats, and schemas in the computer system 600 may be derived from standards including but not limited to JavaScript Object Notation (JSON), Extensible Markup Language (XML), Yet Another Markup Language (YAML), Extensible Hypertext Markup Language (XHTML), Wireless Markup Language (WML), MessagePack, XML User Interface Language (XUL), or any other functionally similar representations alone or in combination. Alternatively, proprietary data structures, formats, or schemas may be used, either exclusively or in combination with known or open standards.

In some embodiments, a tangible, non-transitory apparatus or article of manufacture comprising a tangible, non-transitory computer usable or readable medium having control logic (software) stored thereon may also be referred to herein as a computer program product or program storage device. This includes, but is not limited to, the computer system 600, the main memory 608, the secondary memory 610, and the removable storage units 618 and 622, as well as tangible articles of manufacture embodying any combination of the foregoing. Such control logic, when executed by one or more data processing devices (such as the computer system 600), may cause such data processing devices to operate as described herein.

Based on the teachings contained in this disclosure, it will be apparent to persons skilled in the relevant art(s) how to make and use embodiments of this disclosure using data processing devices, computer systems and/or computer architectures other than that shown in FIG. 6. In particular, embodiments can operate with software, hardware, and/or operating system implementations other than those described herein.

The present invention has been described above with the aid of functional building blocks illustrating the implementation of specified functions and relationships thereof. The boundaries of these functional building blocks have been arbitrarily defined herein for the convenience of the description. Alternate boundaries can be defined so long as the specified functions and relationships thereof are appropriately performed.

The foregoing description of the specific embodiments will so fully reveal the general nature of the invention that others can, by applying knowledge within the skill of the art, readily modify and/or adapt for various applications such specific embodiments, without undue experimentation, without departing from the general concept of the present invention. Therefore, such adaptations and modifications are intended to be within the meaning and range of equivalents of the disclosed embodiments, based on the teaching and guidance presented herein. It is to be understood that the phraseology or terminology herein is for the purpose of description and not of limitation, such that the terminology or phraseology of the present specification is to be interpreted by the skilled artisan in light of the teachings and guidance.

The breadth and scope of the present invention should not be limited by any of the above-described exemplary embodiments but should be defined only in accordance with the following claims and their equivalents.

What is claimed is:

1. A method, comprising:
monitoring, at a user equipment (UE) device, a present location of a LE device;
generating, at the UE device, at least one pattern based on analysis of historical locations of the UE device;
receiving, at the UE device, a request to access a protected application;
retrieving traffic data associated with the present location responsive to the request;
generating a locational range based on the traffic data and the at least one pattern;
comparing, at the UE device, the present location of the UE device with the at least one pattern and corresponding time data associated with the request to access the protected application;
determining that the present location falls within the locational range generated based on the traffic data; and
determining, at the UE device, a level of authentication necessary to grant access to the protected application based on both the comparing and the determining that the present location falls within the locational range generated based on the traffic data.

2. The method of claim 1, wherein the protected application is one of a mobile application, a smartwatch application, a web browser, or a rich web application.

3. The method of claim 1, wherein the monitoring comprises:
monitoring, at the UE device, location information of the UE device at a configurable time duration; and
storing, in a memory at the UE device, the location information and corresponding time information.

4. The method of claim 1, wherein the determining the level of authentication comprises:
determining, at the UE device, that the present location of the UE device corresponding to the time data associated with the request to access the protected application matches with the locational range; and determining, at the UE device, no authentication and no two-factor authentication are required to grant access to the protected application.

5. The method of claim 1, wherein the determining the level of authentication comprises:
   determining, at the UE device, that the present location of the UE device corresponding to the time data associated with the request to access the protected application does not match with the at least one pattern generated based on the analysis of the historical locations monitored activities;
   determining, at the UE device, that a first level of authentication of the UE device is required to grant access to the protected application when a mismatch with the present location determined from the at least one pattern corresponds to a time difference within a configurable time threshold period, or a second level of authentication of the UE device is required when the time difference is outside a configurable time threshold period.

6. The method of claim 1, wherein the at least one pattern or level of authentication is configurable.

7. The method of claim 1, wherein the retrieving comprises retrieving weather data, and wherein the locational range is generated based on both the traffic data and the weather data.

8. The method of claim 1, wherein the monitoring further comprises:
   monitoring, at the UE device; a time of day when an application of a plurality of applications on the UE device is accessed by the UE device and a time duration for which the application is in use each time it is accessed by the UE device; and
   storing, in a memory at the UE device, the time of day, the application being accessed by the UE device, and the time duration.

9. The method of claim 8, wherein the generating the at least one pattern comprises:
   predicting, at the UE device, an activity of the UE device based on analysis of the monitored time of day when the application is accessed on the UE device; and
   verifying, at the LIE device, the predicted activity based on the monitoring.

10. A user equipment (UE) device, comprising:
    a memory for storing instructions; and
    one or more processors, communicatively coupled to the memory, configured to execute the instructions, the instructions causing the one or more processors to:
    monitor a present location of a UE device;
    generate, at the UE device, at least one pattern based on analysis of historical locations of the UE device;
    receive, at the UE device, a request to access a protected application;
    retrieve traffic data associated with the present location responsive to the request;
    generate a locational range based on the traffic data and the at least one pattern:
    compare, at the UE device, the present location of the LIE device with the at least one pattern and corresponding time data associated with the request to access the protected application;
    determine that the present location falls within the locational range generated based on the traffic data; and
    determine a level of authentication necessary to grant access to the protected application based on both the comparing and the determination that the present location falls within the locational range generated based on the traffic data.

11. The UE device of claim 10, wherein the protected application is one of a mobile application, a smartwatch application, a web browser, or a rich web application.

12. The system of claim 10, to monitor, the one or more processors are further configured to:
    monitor location information of the UE device at a configurable time duration; and
    store, in the memory at the UE device, the location information and corresponding time information.

13. The system of claim 10, wherein to determine the level of authentication, the one or more processors are further configured to:
    determine that the present location of the UE device corresponding to the time data associated with the request to access the protected application matches with the locational range; and
    determine that no authentication and no two-factor authentication are required to grant access to the protected application.

14. The system of claim 10, wherein to determine the level of authentication, the one or more processors are further configured to:
    determine that the present location of the UE device corresponding to the time data associated with the request to access the protected application does not match with the at least one pattern generated based on the analysis of the historical locations;
    determine that a first level of authentication of the UE device is required to grant access to the protected application when a mismatch with the present location determined from the at least one pattern corresponds to a time difference within a configurable time threshold period, or a second level of authentication of the UE device is required when the time difference is outside a configurable time threshold period.

15. The system of claim 10, wherein the at least one pattern or level of authentication is configurable.

16. The UE device of claim 10, wherein to monitor, the one or more processors are further configured to:
    monitor a time of day when an application of a plurality of applications on the UE device is accessed by the UE device and a time duration for which the application is in use each time it is accessed by the UE device; and
    store, in the memory, the time of day, the application being accessed by the UE device, and the time duration.

17. The system of claim 16, wherein to generate the at least one pattern, the one or more processors are further configured to:
    predict an activity of the UE device based on analysis of the monitored time of day when the application is accessed on the UE device; and
    verify the predicted activity based on the monitoring.

18. A non-transitory, tangible computer-readable device having instructions stored thereon that, when executed by at least one computing device, cause the at least one computing device to perform operations comprising:
    monitoring a present location of a UE device;
    generating, at the UE device, at least one pattern based on analysis of historical locations of the UE device;
    receiving, at the UE device, a request to access a protected application;
    retrieving traffic data associated with the present location responsive to the request;

generating a locational range based on the traffic data and the at least one pattern;
comparing, at the UE device, the present location of the UE device with the at least one pattern and corresponding time data associated with the request to access the protected application;
determining that the present location falls within the locational range generated based on the traffic data; and
determining a level of authentication necessary to grant access to the protected application based on both the comparing and the determining that the present location falls within the locational range generated based on the traffic data.

19. The non-transitory, tangible computer-readable device of claim 18, wherein the protected application is one of a mobile application, a smartwatch application, a web browser, or a rich web application.

20. The non-transitory, tangible computer-readable device of claim 18, the operations further comprising:
monitoring a time of day when an application of a plurality of applications on the UE device is accessed by the UE device and time duration for which the application is in use each time it is accessed by the UE device;
monitoring location information of the UE device at a configurable time duration;
storing, in a memory, the time of day and the application being accessed by the UE device, and the time duration for which the application is in use; and
storing, in the memory, the location information and corresponding time information.

21. The non-transitory, tangible computer-readable device of claim 18, the operations further comprising:
determining that the present location of the UE device corresponding to the time data associated with the request to access the protected application matches with the locational range; and
determining that no authentication and no two-factor authentication are required to grant access to the protected application.

* * * * *